(12) United States Patent
State et al.

(10) Patent No.: US 10,698,945 B2
(45) Date of Patent: Jun. 30, 2020

(54) SYSTEMS AND METHODS TO PREDICT HASHTAGS FOR CONTENT ITEMS

(71) Applicant: Facebook, Inc., Menlo Park, CA (US)

(72) Inventors: Bogdan State, Menlo Park, CA (US); Amaç Herdağdelen, Mountain View, CA (US); Maxime Boucher, Mountain View, CA (US); Ehud Weinsberg, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 1081 days.

(21) Appl. No.: 14/829,537

(22) Filed: Aug. 18, 2015

(65) Prior Publication Data

US 2017/0052954 A1    Feb. 23, 2017

(51) Int. Cl.
| | | |
|---|---|---|
| G06F 16/48 | (2019.01) | |
| G06N 20/00 | (2019.01) | |
| G06F 16/38 | (2019.01) | |
| G06F 16/438 | (2019.01) | |

(52) U.S. Cl.
CPC ............ *G06F 16/48* (2019.01); *G06F 16/381* (2019.01); *G06F 16/438* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2015/0170152 A1* | 6/2015 | Shaffer | ................ | G06Q 30/016 705/304 |
| 2016/0189040 A1* | 6/2016 | Vickrey | .................. | G06N 5/04 706/12 |
| 2016/0189045 A1* | 6/2016 | Vickrey | ................ | G06N 5/048 706/12 |
| 2016/0269344 A1* | 9/2016 | Anders | .................... | H04L 51/32 |
| 2016/0328401 A1* | 11/2016 | Dhawan | ............ | G06F 17/30867 |
| 2017/0052954 A1* | 2/2017 | State | ................ | G06F 17/30038 |
| 2017/0154055 A1* | 6/2017 | Dimson | ............ | G06F 17/30256 |
| 2017/0193073 A1* | 7/2017 | Tannen | ............. | G06F 17/30598 |
| 2017/0270180 A1* | 9/2017 | State | ................ | G06F 17/30598 |

OTHER PUBLICATIONS

Weston et al. "#TagSpace: Semantic Embeddings from Hashtags", Oct. 29, 2014, EMNLP, pp. 1822-1827 (Year: 2014).*
Mazzia et al., "Suggesting Hashtags on Twitter", 2009, Computer Science and Engineering, University of Michigan, pp. 1-8 (Year: 2009).*
Roman et al., "Twitter Hash Tag Recommendation", Jan. 31, 2015, pp. 1-12 (Year: 2015).*
Chen et al., "TeRec: A Temporal Recommender System Over Tweet Stream", Proceedings of the VLDB Endowment, Aug. 30, 2013, vol. 6 No. 12, pp. 1254-1257 (Year: 2013).*
U.S. Appl. No. 14/582,731, filed Dec. 24, 2014.
U.S. Appl. No. 14/582,920, filed Dec. 24, 2014.

* cited by examiner

*Primary Examiner* — Paulinho E Smith
(74) *Attorney, Agent, or Firm* — Sheppard Mullin Richter & Hampton LLP

(57) ABSTRACT

Systems, methods, and non-transitory computer readable media configured to acquire data associated with a content item, the data associated with the content item including contextual information. The data associated with the content item can be provided to a model trained by machine learning. A set of hashtags associated with the content item can be determined based on the model.

20 Claims, 8 Drawing Sheets

500

```
┌─────────────────────────────────────────────────────────────┐
│ Detect occurrence of a triggering event associated with an  │
│ action taken by a user on a client computing device that    │
│ indicates an intent to create a hashtag for a content item  │
│                           502                                │
└─────────────────────────────────────────────────────────────┘
                              │
                              ▼
┌─────────────────────────────────────────────────────────────┐
│ Acquire data associated with the content item, the data     │
│ associated with the content item including contextual       │
│ information                                                  │
│                           504                                │
└─────────────────────────────────────────────────────────────┘
                              │
                              ▼
┌─────────────────────────────────────────────────────────────┐
│ Provide the data associated with the content item to a      │
│ model trained by machine learning                           │
│                           506                                │
└─────────────────────────────────────────────────────────────┘
                              │
                              ▼
┌─────────────────────────────────────────────────────────────┐
│ Sort the set of hashtags based on confidence values         │
│                           508                                │
└─────────────────────────────────────────────────────────────┘
                              │
                              ▼
┌─────────────────────────────────────────────────────────────┐
│ Select a subset of the set of hashtags based on a           │
│ predetermined threshold                                      │
│                           510                                │
└─────────────────────────────────────────────────────────────┘
                              │
                              ▼
┌─────────────────────────────────────────────────────────────┐
│ Provide the subset of the set of hashtags to a client       │
│ computing device                                             │
│                           512                                │
└─────────────────────────────────────────────────────────────┘
```

FIGURE 5

SYSTEMS AND METHODS TO PREDICT HASHTAGS FOR CONTENT ITEMS

FIELD OF THE INVENTION

The present technology relates to the field of content classification. More particularly, the present technology relates to techniques for identifying hashtags for content.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can take a variety of forms. For example, content can include publication of text, images, video, or a combination thereof to a selected audience of the social network. In particular, content can include, for example, images uploaded by a user, images uploaded by others in the social network of the user, descriptions of activities of connections of the user, articles regarding subject matter of interest to the user, advertisements directed to the user, etc.

Content can be associated with one or more hashtags. A user can create and use hashtags by, for example, placing a hash character # in front of a word or unspaced phrase as text associated with content. A hashtag can function as a type of label or metadata tag that can be used in a social network to describe, organize, and facilitate discovery of associated content. Accordingly, the absence of hashtags for content can present various disadvantages in content management for a social network and its users.

SUMMARY

Various embodiments of the present disclosure can include systems, methods, and non-transitory computer readable media configured to acquire data associated with a content item, the data associated with the content item including contextual information. The data associated with the content item can be provided to a model trained by machine learning. A set of hashtags associated with the content item can be determined based on the model.

In an embodiment, the data associated with the content item can further include at least one of text information, user information, an image, and video associated with the content item.

In an embodiment, the determining a set of hashtags can further comprise determining a confidence value for each hashtag in the set of hashtags. The set of hashtags can be sorted based on confidence values.

In an embodiment, the determining a set of hashtags can further comprise selecting a subset of the set of hashtags based on a predetermined threshold.

In an embodiment, the subset of the set of hashtags can be provided to a client computing device.

In an embodiment, one or more hashtags from the subset of the set of hashtags can be presented for selection in a user interface displayed by the client computing device based on keystrokes typed by a user.

In an embodiment, the machine learning can include use of a neural network.

In an embodiment, the contextual information can include at least one of time of day, day of week, week of year, and location associated with creation of the content item.

In an embodiment, the model can be trained based on the data associated with the content item and hashtags associated with the content item.

In an embodiment, an occurrence of a triggering event associated with an action taken by a user on a client computing device that indicates an intent to create a hashtag for the content item can be detected.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example second method to determine hashtags for a content item, according to an embodiment of the present disclosure.

Figure 1:
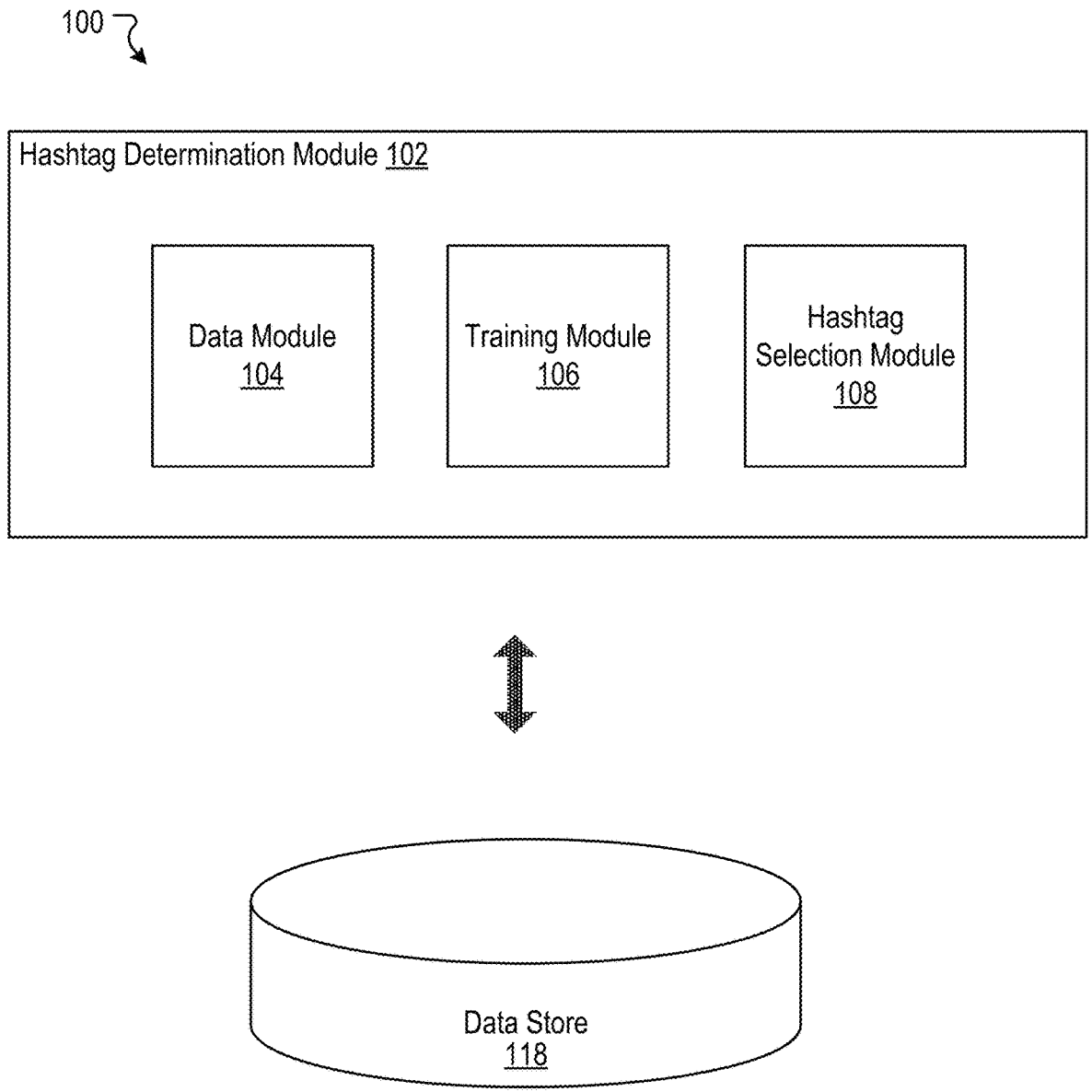
FIG. 1 illustrates a system including an example hashtag determination module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Predicting Hashtags

People can use social networking systems (or services) for various purposes. Users of a social networking system can utilize their computing devices (or systems) to establish connections, communicate, and interact with one another via the social networking system. Users can also provide, create, edit, share, or access content such as images, videos, audio, articles, links, and text. In one example, a particular user of the social networking service can post or publish content items, which can be presented on a page (e.g., profile, timeline, wall, etc.) of the user. Other users, for example, can access, view, or interact with such content items published on the page of the user in accordance with privacy settings or preferences selected by the user.

Social networking systems manage content in accordance with various considerations. One important consideration is the ability to effectively describe, categorize, and search content provided by users of a social networking system. Hashtags have become one important mechanism to facilitate content management in this regard. A hashtag is a type of label or metadata tag that can be used in a social networking system to organize content items and to facilitate discovery of content items. For example, a search based on a particular hashtag can return content items associated with the hashtag or similar variations of the hashtag.

As the amount of content managed by a social networking system increases, so does the importance of mechanisms like hashtags to facilitate effective content management. Without hashtags, proper labeling of a content item according to preferences of a user who uploaded the content item can be challenging. For example, an inability to properly label a content item can preclude proper categorization of the content item. Further, when a search based on hashtags is performed by a user, the absence of any hashtags (or sufficiently descriptive hashtags) associated with a content item can complicate or preclude discovery of the content item. Despite the importance of hashtags to avoid these problems rooted in computer technology and related internet interactions, users who upload content items often still fail to create hashtags for the content items or fail to create hashtags that are optimally descriptive of the content items. As a result, user experience on the social networking system with respect to the content items can suffer. As yet another example, even when users choose to create hashtags for their content items, the hashtags can be duplicative of other hashtags that are semantically similar. Duplication of hashtags in this regard also can detrimentally impact optimal categorization and searching of content items.

An improved approach for predicting hashtags for content items (e.g., posts) based on computer technology overcomes disadvantages associated with conventional approaches. In general, systems, methods, and computer readable media of the present disclosure can acquire data associated with content items for which hashtags are to be predicted. The data associated with the content items can include but is not limited to text information associated with the content items, user information associated with users who provide the content items, and contextual information associated with the content items. In a training phase, the data associated with the content items and hashtags associated with the content items that are already known can be used in a machine learning process to train a model (or classifier). The model can be re-trained based on data associated with new content items as the data becomes available. In an evaluation phase, a triggering event can be detected in connection with a new content item provided by a user. Data associated with the new content item can be provided to the model. The model can provide a set of hashtags and their corresponding confidence values. The set of hashtags can be sorted based on their confidence values. A subset of the set of hashtags having confidence values that satisfy a predetermined threshold confidence value can be provided to a client computing device associated with the user. Based on user action suggestive of an intent by the user to create a hashtag, one or more hashtags can be selected from the subset of the set of hashtags for presentation to and selection by the user to associate with the new content item.

FIG. 1 illustrates an example system 100 including an example hashtag determination module 102 to identify hashtags associated with content items, according to an embodiment of the present disclosure. A content item (e.g., post) for which one or more hashtags can be identified by the hashtag determination module 102 can include one or more of text information, an image, a video, audio, or the like. The content item can be provided (e.g., created, uploaded, shared, etc.) by a user to a social networking system or any other type of system in which hashtags can be associated with the content item.

The hashtag determination module 102 can include a data module 104, a training module 106, and a hashtag selection module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the hashtag determination module 102 can be implemented in any suitable combinations.

The data module 104 can analyze a content item, and identify or acquire various types of data associated with the content item. The data associated with the content item can include, for example, text information, user information, and contextual information. Text information can include text on word-by-word basis provided in connection with the content item. Such text can include, for example, a comment, annotation, caption, or other remarks provided by the user about or in the content item.

User information can include any information about the user. User information can include, for example, demographic information about the user, such as age, gender status, address, educational level, ethnicity, profession, religion, etc. User information also can include any suitable information about the social networking status of the user, such as connections of the user, subject matter liked by the user, pages or entities followed by the user, group membership of the user, etc.

Contextual information can include any information regarding the context surrounding the content item. Contextual information can include, for example, time information and location information. Time information can include, for example, time of day, day of week, week of year, or other indication of time associated with creation or provision of the content item. Location information can include, for example, location of the user during creation of the content item, location of the user during uploading of the content item, location of an image or video included in the content item (e.g., location of a device that capture the image or video), etc. Contextual information also can include other types of information, such as weather data, current event data, social networking data, etc. that coincides with or otherwise relates to the content item. In some embodiments, the data associated with the content item also can include an image (or video) included in the content item.

The data associated with the content item can be provided from a variety of sources, such as metadata embedded in or otherwise associated with the content item, a client computing device used by the user to capture or upload the content item to the social networking system, a profile about the user maintained by a social networking system to which the content item has been provided, etc. Some of the data associated with the content item can be provided from a client computing device, such as the user device 610, to a server-side system implementing one or more functionalities or modules of the hashtag determination module 102, such as the social networking system 630. In one example, the text information of a content item can be formatted by a client computing device as a message augmented with a token that is encoded with the contextual information before provision to the server-side system for processing.

The training module 106 can receive data associated with content items for which users or others (e.g., an administrator of a social networking system) have already created hashtags. The data associated with the content items can include, for example, text information on a word-by-word basis, user information, and contextual information. In a training phase, the data associated with the content items can be used as features to train a machine learning model to determine hashtags for a content item and an associated confidence value for each hashtag. In some embodiments, a confidence value can be a value between 0 and 1, with 1 representing a highest confidence value for the hashtag in relation to the content item. In some embodiments, a machine learning technique to train the model can include a neural network. In other embodiments, other machine learning techniques can be used.

In some embodiments, images or video included in the content items also can be included in the data associated with the content items to train the model to determine hashtags. The management of tags in connection with images and video is further described in U.S. patent application Ser. No. 14/582,731, entitled "Tag Prediction For Images Or Video Content Items" and filed Dec. 24, 2014, and U.S. patent application Ser. No. 14/582,920, entitled "Tag Prediction For Content Based On User Metadata" and filed Dec. 24, 2014, the entireties of which are incorporated herein by reference.

The training module 106 can re-train the model. The model can be re-trained based on access to new content items for which users have already created hashtags. For example, the data module 104 can obtain data associated with content items that are new and hashtags associated with the content items after the content items are provided to a social networking system. Such information can be used to develop and refine the model. Re-training of the model can be performed continuously or at regular (or intermittent) intervals. For example, the model can be re-trained hourly, daily, monthly, etc.

The hashtag selection module 108 can determine when a triggering event with respect to a new content item has occurred. Upon occurrence of the triggering event, data associated with the new content item can be provided to the model in an evaluation phase. The model can determine one or more associated hashtags for the content item. The hashtag selection module 108 is described in more detail herein.

In some embodiments, the hashtag determination module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the hashtag determination module 102 can be, in part or in whole, implemented as software running on one or more computing devices or systems, such as on a server or a client computing device. For example, the hashtag determination module 102 can be implemented as or within a dedicated application (e.g., app), a program, or an applet running on a user computing device or client computing system. In some instances, the hashtag determination module 102 can be, in part or in whole, implemented within or configured to operate in conjunction or be integrated with a social networking system (or service), such as a social networking system 630 of FIG. 6. Likewise, in some instances, the hashtag determination module 102 can be, in part or in whole, implemented within or configured to operate in conjunction or be integrated with client computing device, such as a user device 610 of FIG. 6. It should be understood that many variations are possible.

The data store 118 can be configured to store and maintain various types of data, such as the data relating to support of and operation of the hashtag determination module 102. The data can include data relating to, for example, content items, hashtags created by users for the content items, data associated with the content items (e.g., text information, user information, contextual information), one or more models to determine hashtags for content items, hashtags determined by the model, confidence levels of the hashtags determined by the model, a confidence value threshold, etc. The data store 118 also can maintain other information associated with a social networking system. The information associated with the social networking system can include data about users, social connections, social interactions, locations, geofenced areas, maps, places, events, groups, posts, communications, content, account settings, privacy settings, and a social graph. The social graph can reflect all entities of the social networking system and their interactions. As shown in the example system 100, the hashtag determination module 102 can be configured to communicate and/or operate with the data store 118.

Figure 2:
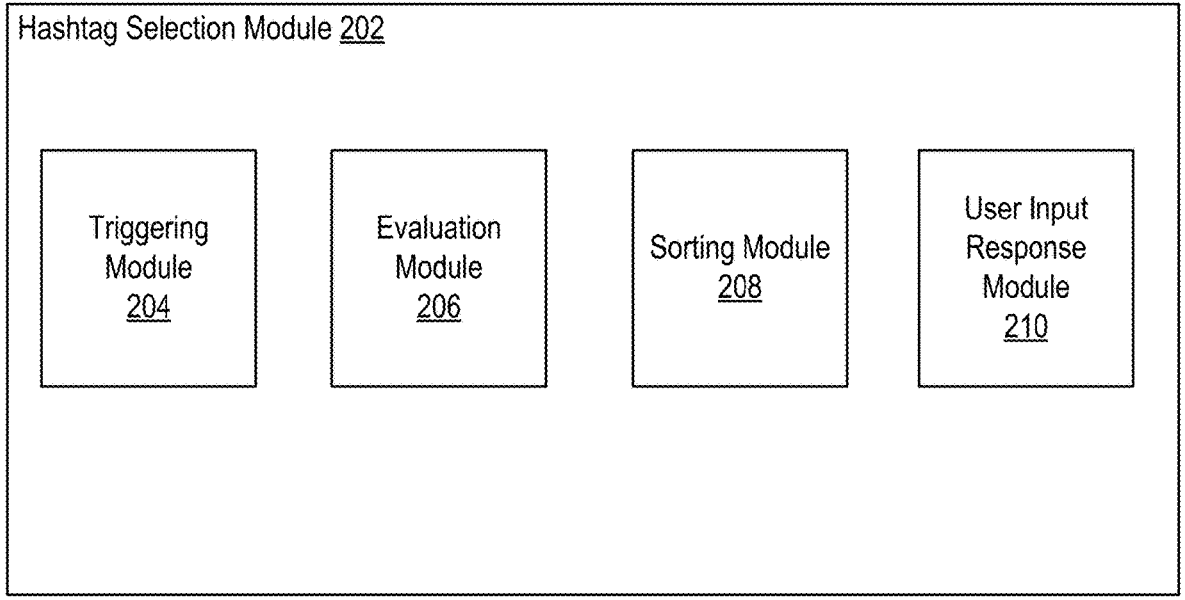
FIG. 2 illustrates an example hashtag selection module, according to an embodiment of the present disclosure.

FIG. 2 illustrates an example hashtag selection module 202, according to an embodiment of the present disclosure. In some embodiments, the hashtag selection module 108 of FIG. 1 can be implemented with the hashtag selection module 202. As shown in the example of FIG. 2, the hashtag selection module 202 can include a triggering module 204, an evaluation module 206, a sorting module 208, and a user input response module 210.

The triggering module 204 can detect a triggering event to initiate determination of hashtags for a content item. In some embodiments, the triggering event can be an action taken by a user on a client computing device that provides the content item for further distribution or indicates or suggests that the user intends to create a hashtag for the content item. In this regard, the triggering event can include, for example, uploading of the content item by the user to a social networking system or further sharing of the content item by the user. As another example, the triggering event can include typing by the user of the key # of a user interface presented on a client computing device to indicate her intent to create a hashtag, interaction by the user with a user interface element dedicated to receiving entry of a hashtag, etc.

The evaluation module 206 can acquire data associated with a content item after occurrence of a triggering event. The data associated with the content item can be provided by the data module 104. The evaluation module 206 can provide the data associated with the content item to the model. Based on the data associated with the content item, the model can determine a set of hashtags for the content item and associated confidence values for the set of hashtags.

The set of hashtags can be streamlined to avoid duplication. In some embodiments, the evaluation module 206 can identify similar (or clustered) hashtags that are likely redundant and assign a standardized hashtag to represent the similar hashtags. For example, the similar hashtags # ValentineDay, # V-Day, # ValentinesDay, and # Valentine'sDay can be represented by one hashtag # St.Valentine'sDay. The streamlining of similar hashtags in this manner can enhance the effectiveness of hashtags in facilitating the organization and searching of content items.

The sorting module 208 can sort the set of hashtags based on their confidence values. In some embodiments, the sorting module 208 can sort the set of hashtags according to confidence values in descending order from highest value to lowest value. A predetermined threshold, such as a threshold confidence level, can be used to select a subset of the set of hashtags. In some embodiments, the predetermined threshold can be a selected confidence value such that hashtags associated with confidence values that are greater than (or equal to) the selected confidence level are selected for inclusion in the subset of the set of hashtags. In some embodiments, the predetermined threshold can be a selected number of hashtags such that the selected number of hashtags associated with the highest confidence values in the set of hashtags are identified as the subset of the set of hashtags. The predetermined threshold can be configurable and selected by an administrator of a social networking system or other system implementing the hashtag selection module 202.

The user input response module 210 can receive the subset of the set of hashtags. The user input response module 210 can detect keystrokes from a user interface by a user who intends to create a hashtag for a content item. Based on one or more keystrokes by the user, the user input response module 210 can select hashtags from the subset of the set of hashtags that are consistent with the intent of the user as indicated by her keystrokes. For example, when a first keystroke is detected, the user input response module 210 can select from the subset of the set of hashtags only those hashtags whose first character corresponds to the first keystroke. When a second keystroke is detected, the user input response module 210 can further select from the subset of the set of hashtags only those hashtags whose first character and second character correspond to the first keystroke and second keystroke, respectively, and so on. In this manner, the user input response module 210 can select hashtags that match the intent of the user as indicated by her keystrokes in creating a hashtag.

The user input response module 210 can cause hashtags that match the indicated intent of the user to be displayed to the user for selection as the user types a hashtag. The ability to select hashtags allows the user to avoid the need to type the hashtag entirely. The ease with which to associate a hashtag with a content item in this manner can encourage the creation of hashtags and thereby improve user experience in a social networking system. Further, because the hashtags presented for selection are streamlined to avoid duplication, the hashtags selected for the content item can facilitate more optimal categorization and discovery of the content item. In some embodiments, the user input response module 210 can be, in whole or in part, implemented by a client computing device.

In some embodiments, the hashtag selection module 202 can present hashtags to a user automatically. In this regard, one or more of the hashtags in the subset of the set of hashtags can be presented to the user without action taken by the user indicating that the user intends to create a hashtag (e.g., typing the "#" key). For example, a client computing device can cause the one or more of the hashtags in the subset of the set of hashtags to be presented to the user after detecting that the user is ready to provide or has provided a content item to the social networking system.

Figure 3:
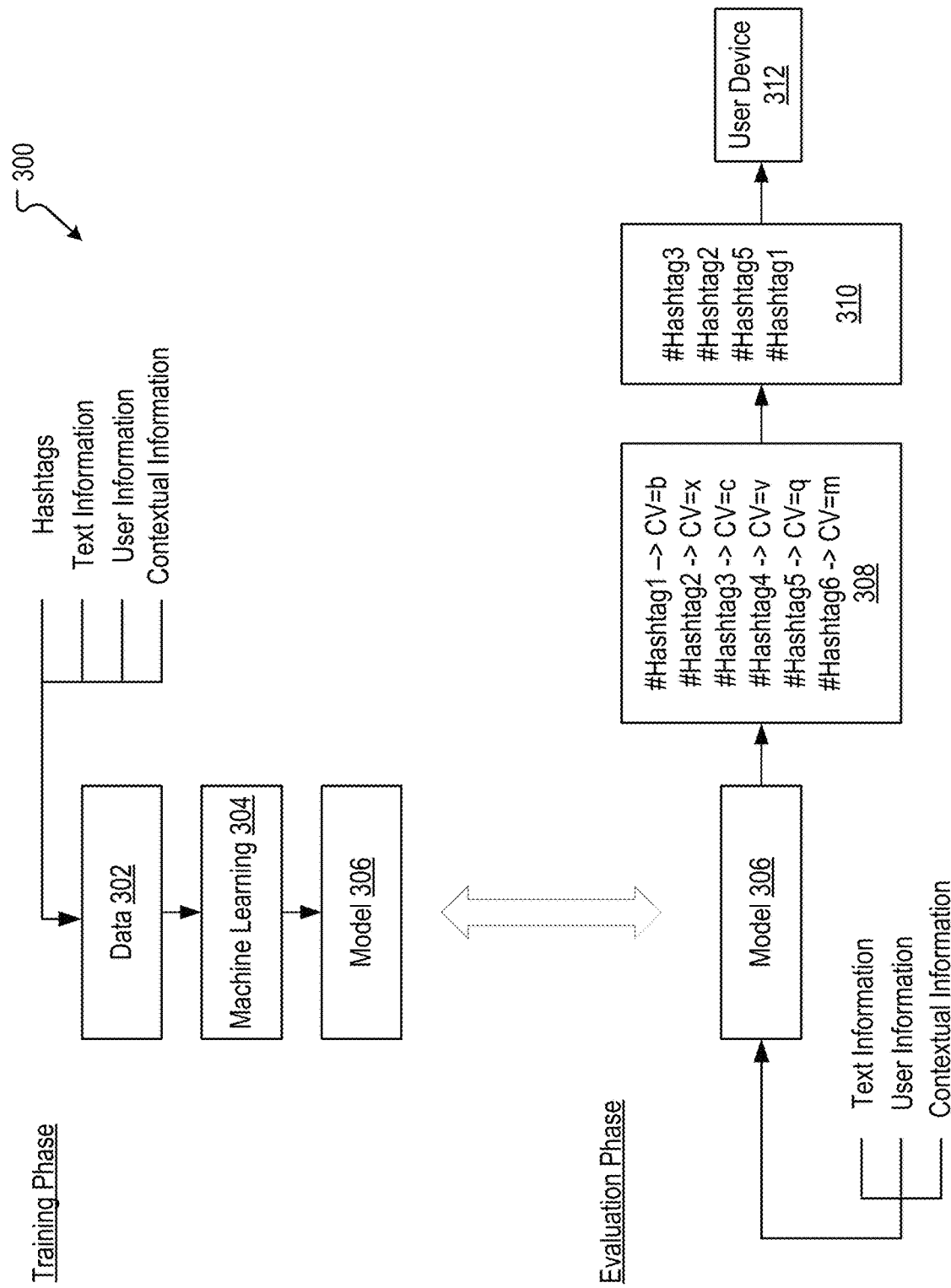
FIG. 3 illustrates an example functional diagram, according to an embodiment of the present disclosure.

FIG. 3 illustrates an example functional diagram 300 illustrating determination of hashtags for a content item, according to an embodiment of the present disclosure. In a training phase, the functional diagram 300 includes provision of data 302 to a technique of machine learning 304 to train a model 306 for determining hashtags for content items. The data 302 can include data associated with content items and hashtags already created for the content items. The hashtags may have been created by, for example, users of a social networking system who provided the content items for publication on the social networking system or administrators of the social networking system. The data associated with the content items can include text information, user information, and contextual information. Although not shown, in some embodiments, the data associated with the content items also can include images (and videos) appearing in the content items. The machine learning 304 can be any suitable machine learning technique, such as a neural network. The model 306 can be re-trained at intermittent or regular intervals based on new content items and, in particular, data associated with the new content items and their associated hashtags.

For example, with respect to the training phase, assume that a user of a social networking system has uploaded to the social networking system a content item including an image of a coffee cup and the caption "amazing coffee" along with a hashtag # coffee. In this example, assume further that the content item was created at a particular time (e.g., 2:12 pm), a particular day of the week (e.g., Tuesday), a particular week of the year (e.g., last week of the year), and a particular location (e.g., Times Square) relating to creation of the content item. With respect to this example, assume further that the user is 34 years old who self-identifies as female. As text information, the caption can be provided to the machine learning 304 on a word-by-word basis (i.e., "amazing", "coffee") to train the model 306. Further, as user information, the age (i.e., 34 years old) and gender (i.e., female) of the user can be provided to the machine learning 304 to train the model 306. Further still, as contextual information, the particular time (i.e., 2:12 pm), the particular day of the week (i.e., Tuesday), the particular week of the year (i.e., last week of the year), and the particular location (i.e., Times Square) can be provided to the machine learning 304 to train the model. In some embodiments, standardized data associated with a content item instead can be provided to the machine learning 304 to train the model 306. For example, instead of the particular time of 2:12 pm, a standardized time of 2:00 pm can be used. Likewise, as another example, instead of the particular location of Times Square, a standardized location of New York can be used. The hashtag # coffee also can be provided to the machine learning 304. In some embodiments, the image of the coffee cup also can be provided to the machine learning 304 to train the model 306. Other content items and, in particular, the data associated with the content items and their corresponding hashtags likewise can be provided to the machine learning 304 to train the model 306.

In an evaluation phase, the model 306 can be used to determine hashtags for a content item provided to the social networking system as well as a confidence value for the content item. The determination of hashtags can be initiated upon occurrence of a triggering event, such as typing of "#" by the user into a user interface presented by a user device 312. Data associated with the content item can be provided to the model 306. The data associated with the content item can include text information, user information, and contextual information. In some embodiments, an image (or video) included in the content item also can be provided to the model 306 if the model 306 was trained with image (or video) data. The data associated with the content item can be provided from the social networking system and the user device 312. The model 306 can provide one or more hashtags associated with the content item and corresponding confidence values. As shown, a set of hashtags 308, as an example, are provided by the model 306. The set of hashtags 308 is associated with corresponding confidence values (CVs) as follows: # Hashtag1→CV=b, # Hashtag2→CV=x, # Hashtag3→CV=c, # Hashtag4→CV=v, # Hashtag5→CV=q, # Hashtag6→CV=m, where b, x, c, v, q, and m are values between 0 and 1.

The set of hashtags 308 can be sorted according to their confidence values. Application of a predetermined threshold can cause selection of a subset 310 of the set of hashtags 308. For example, assume a predetermined threshold relating to a confidence value of TCV=f, where f is a value between 0 and 1. In this example, all of the hashtags associated with confidence values greater than or equal to f can be included in the subset 310. In this example, c, x, q, and b are greater than or equal to f. Accordingly, the corresponding hashtags can be included in the subset 310: # Hashtag3, # Hashtag2, # Hashtag5, and # Hashtag1. The subset 310 can be provided to the user device 312. Based on keystrokes by the user into a user interface presented by the user device 312 during creation of a hashtag, hashtags from the subset 310 can be presented for selection by the user.

For example, assume a user has created a content item having the following message: "So sleepy right now. Need my buzz! #". Typing by the user of "#" in the message can constitute a triggering event that can initiate the evaluation phase. In this example, assume further that the social networking system has determined that the user is 53 years old, self-identifies as male, and has a professional certification in plumbing. With regard to this example, assume further still that creation of the content item occurred at 10 am on a Monday during the third week of January in Burbank, Calif. when the weather was cold and stormy. As text information, the message can be provided to the model 306 on a word-by-word basis. Further, as user information, the age, gender, and profession of the user can be provided to the model 306. Further still, as contextual information, the particular time, the particular day of the week, the particular week of the year, and the particular location relating to creation of the content item can be provided to the model 306. The model 306 can determine a set of hashtags for the content item along with corresponding confidence values. For example, the model 306 can determine the following set of hashtags with corresponding confidence values: # marijuana→CV=0.58, # beer→CV=0.90, # coffee→CV=0.96, # publicradio→CV=0.38, # comfort→CV=0.91, and # caffeine→CV=0.93. The set of hashtags can be sorted based on their corresponding confidence levels. Based on application of a threshold value, a subset of the set of hashtags can be selected for provision to the user device 312. For example, if a threshold value is a threshold confidence value of greater than or equal to 0.90, then the hashtags # coffee, # caffeine, # comfort, and # beer can constitute the subset that can be provided to the user device 312.

Figure 3A:
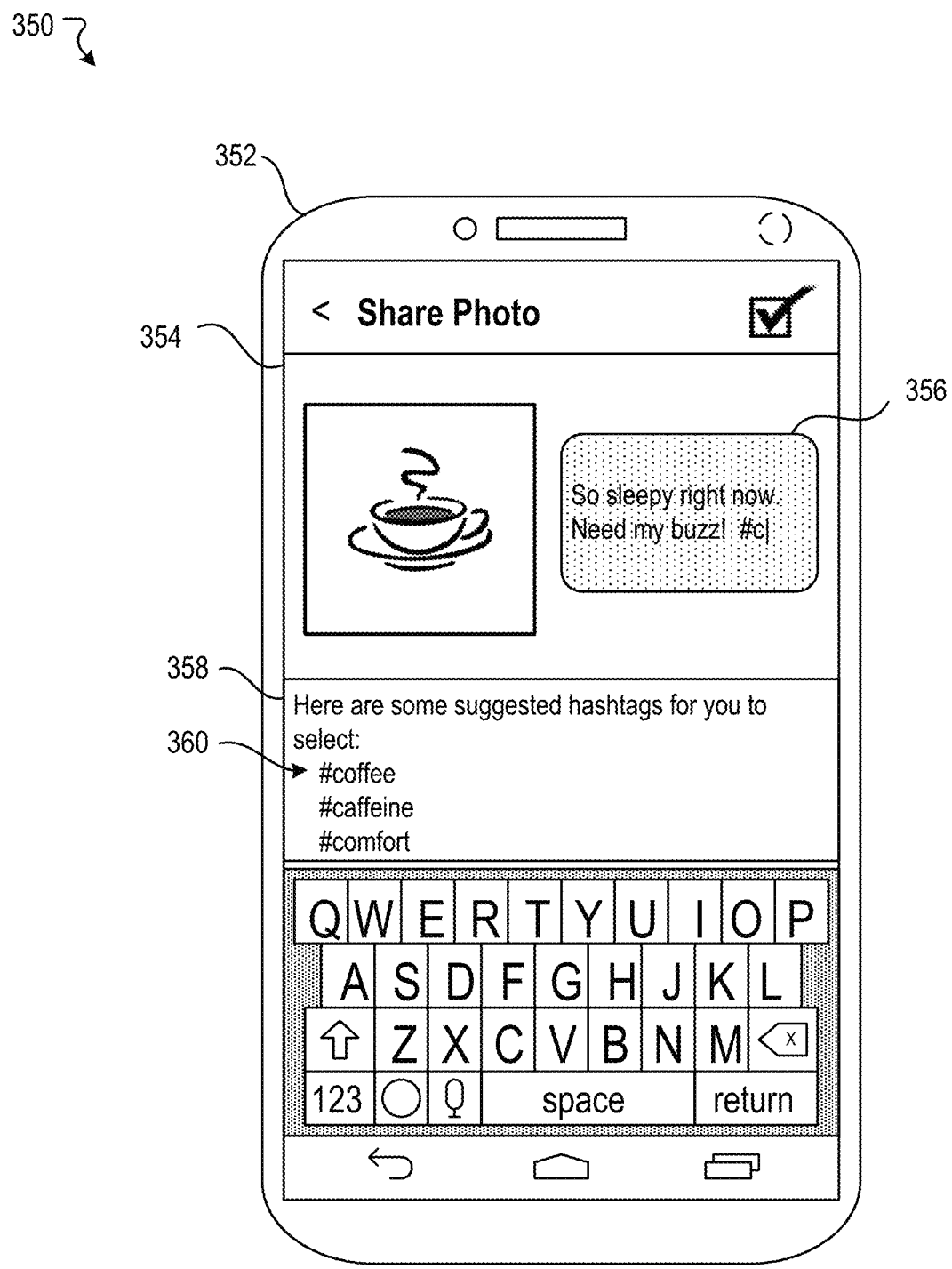
FIG. 3A illustrates an example scenario, according to an embodiment of the present disclosure.

FIG. 3A illustrates an example scenario 350 with respect to a client computing device 352 to allow a user to select a hashtag for a content item, according to an embodiment of the present disclosure. In one embodiment, the client computing device 352 can implement the user device 312. The client computing device 352 can receive a subset of a set of hashtags as determined by the sorting module 208, as discussed in more detail herein. The client computing device 352 can generate a user interface 354 to allow presentation and selection of one or more hashtags from the subset of the set of hashtags. The user interface 354 can display the content item, which includes an image and a caption field 356 to allow the user to enter a caption associated with the image. As the user types a desired hashtag into the caption field 356, those hashtags 360 from the subset of the set of hashtags that correspond to the keystrokes can be presented to the user in a region 358 for presenting the hashtags 360. If the user first types "# c" as shown, then the hashtags # coffee, # caffeine, and # comfort can be presented for selection by the user while the hashtag # beer is not presented to the user. If the user instead first types "# m" (not shown), none of the hashtags of the subset of the set of hashtags are presented for selection by the user.

Figure 4:
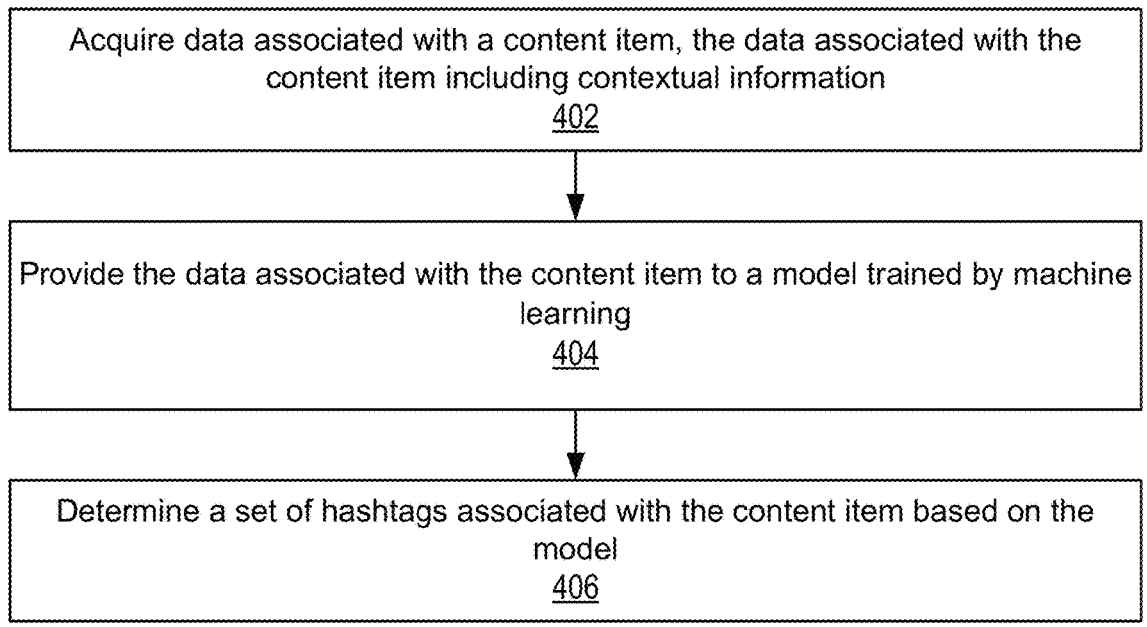
FIG. 4 illustrates an example first method to determine hashtags for a content item, according to an embodiment of the present disclosure.

FIG. 4 illustrates an example first method 400 to determine hashtags for a content item, according to an embodiment of the present disclosure. It should be appreciated that there can be additional, fewer, or alternative steps performed in similar or alternative orders, or in parallel, in accordance with the various embodiments discussed herein unless otherwise stated.

At block 402, the method 400 can acquire data associated with a content item, the data associated with the content item including contextual information. At block 404, the method 400 can provide the data associated with the content item to a model trained by machine learning. At block 406, the method 400 can determine a set of hashtags associated with the content item based on the model. Other suitable techniques that incorporate various features and embodiments of the present disclosure are possible.

FIG. 5 illustrates an example second method 500 to determine hashtags for a content item, according to an embodiment of the present disclosure. It should be appreciated that there can be additional, fewer, or alternative steps performed in similar or alternative orders, or in parallel, in accordance with the various embodiments discussed herein unless otherwise stated.

At block 502, the method 500 can detect occurrence of a triggering event associated with an action taken by a user on a client computing device that indicates an intent to create a hashtag for a content item. At block 504, the method 500 can acquire data associated with the content item, the data associated with the content item including contextual information. At block 506, the method 500 can provide the data associated with the content item to a model trained by machine learning. At block 508, the method 500 can sort the set of hashtags based on confidence values. At block 510, the method 500 can select a subset of the set of hashtags based on a predetermined threshold. At block 512, the method 500 can provide the subset of the set of hashtags to a client computing device. Other suitable techniques that incorporate various features and embodiments of the present disclosure are possible.

Social Networking System—Example Implementation

Figure 6:
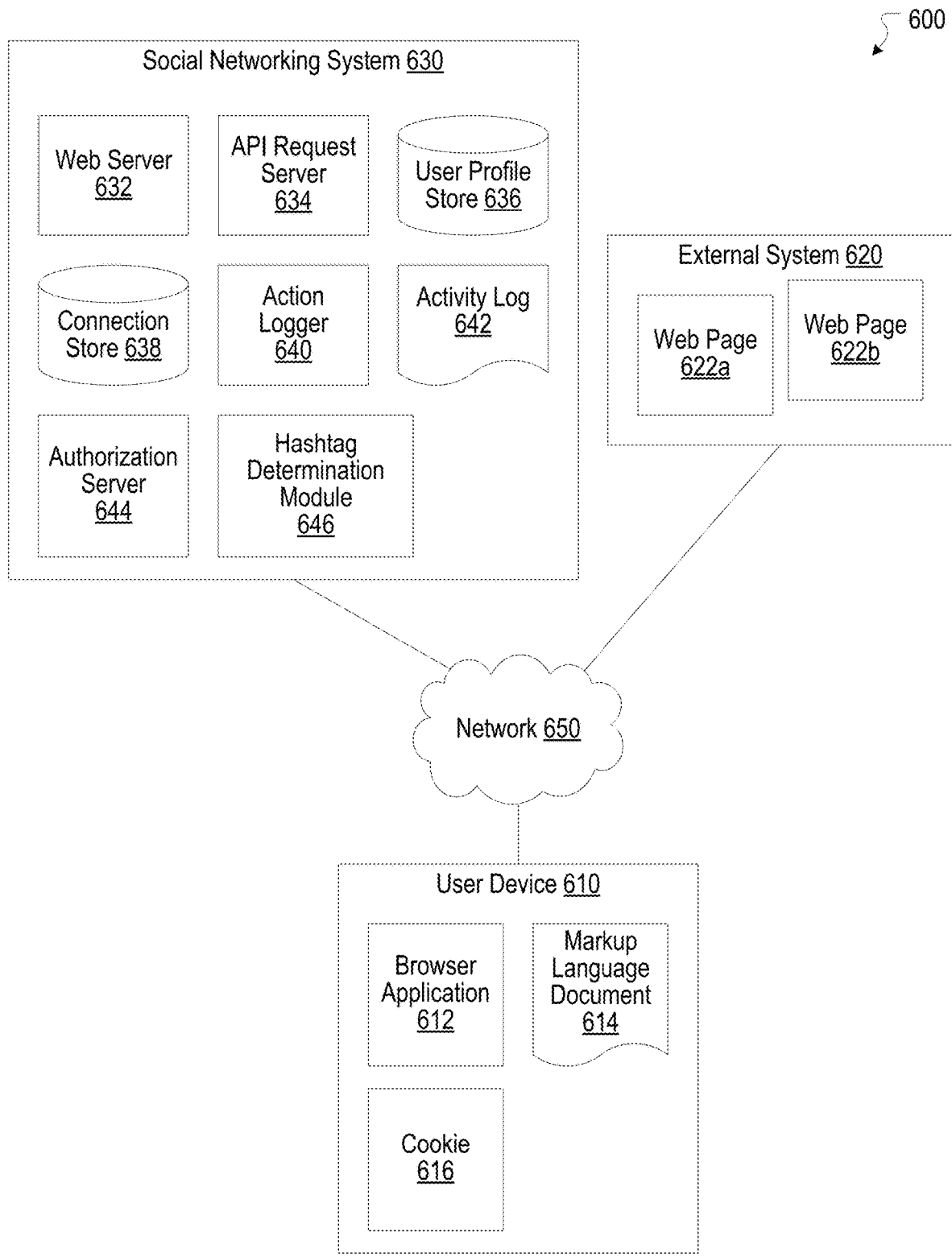
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a hashtag determination module 646. The hashtag determination module 646 can be implemented with the hashtag determination module 102, as discussed in more detail herein. In some embodiments, one or more functionalities of the hashtag determination module 646 can be implemented in the user device 610. For example, a user input response module of the hashtag determination module 646, which can function like the user input response module 210, can be implemented in the user device 610.

Hardware Implementation

Figure 7:
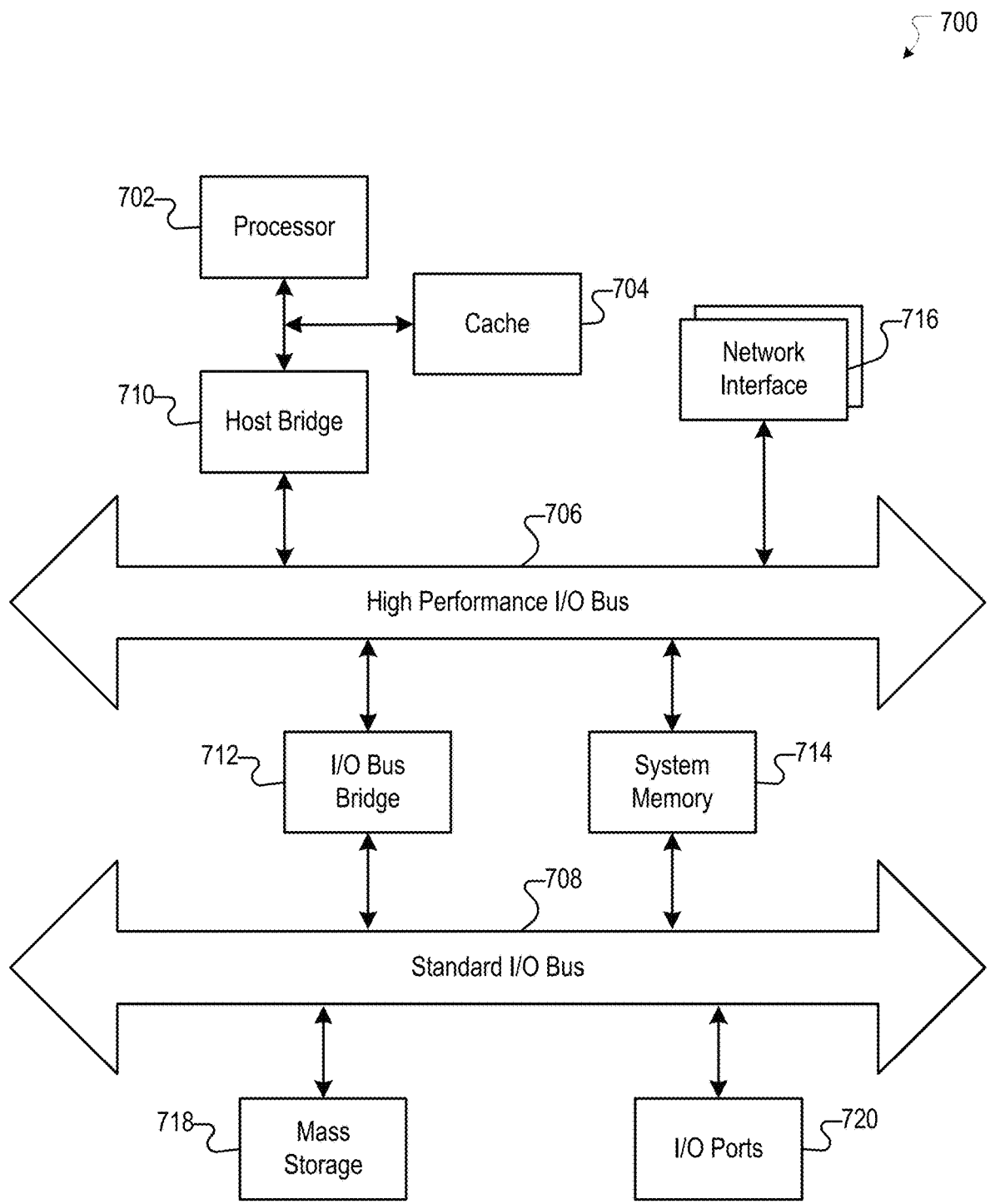
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, training data associated with content items, wherein the content items are associated with hashtags already created by users;
   training, by the computing system, a machine learning model based on the training data and the hashtags associated with the content items;
   upon new content items associated with new hashtags becoming available, refining, by the computing system, the machine learning model based on new data and the new hashtags associated with the new content items; and
   in response to detection of keystrokes typed by a user who intends to create a hashtag for a content item,
      determining, by the computing system, a set of hashtags associated with the content item based on the machine learning model, and presenting, by the computing system, one or more hashtags of the set of hashtags for selection by the user through an user interface, wherein the one or more hashtags are consistent with the intent as indicated by the keystrokes of the user.

2. The computer-implemented method of claim 1, wherein the training data associated with the content items further includes at least one of text information, user information, an image, or video associated with the content item.

3. The computer-implemented method of claim 1, wherein the determining the set of hashtags further comprises:
 determining a confidence value for each hashtag in the set of hashtags; and
 sorting the set of hashtags based on confidence values.

4. The computer-implemented method of claim 3, wherein the determining the set of hashtags further comprises:
 selecting a subset of the set of hashtags based on a predetermined threshold.

5. The computer-implemented method of claim 4, further comprising:
 providing the subset of the set of hashtags to a client computing device.

6. The computer-implemented method of claim 5, wherein one or more hashtags from the subset of the set of hashtags are presented for selection in a user interface displayed by the client computing device based on keystrokes typed by a user.

7. The computer-implemented method of claim 1, wherein the machine learning includes use of a neural network.

8. The computer-implemented method of claim 1, wherein the training data associated with the content items includes contextual information, wherein the contextual information includes at least one of time of day, day of week, week of year, or location associated with creation of the content item.

9. A system comprising:
 at least one processor; and
 a memory storing instructions that, when executed by the at least one processor, cause the system to perform:
  acquiring training data associated with content items, wherein the content items are associated with hashtags already created by users;
  training a machine learning model based on the training data and the hashtags associated with the content items;
  upon new content items associated with new hashtags becoming available, refining the machine learning model based on new data and the new hashtags associated with the new content items; and
  in response to detection of keystrokes typed by a user who intends to create a hashtag for a content item,
   determining a set of hashtags associated with the content item based on the machine learning model, and
   presenting one or more hashtags of the set of hashtags for selection by the user through an user interface, wherein the one or more hashtags are consistent with the intent as indicated by the keystrokes of the user.

10. The system of claim 9, wherein the training data associated with the content items further includes at least one of text information, user information, an image, or video associated with the content item.

11. The system of claim 9, wherein the determining the set of hashtags further comprises:
 determining a confidence value for each hashtag in the set of hashtags; and
 sorting the set of hashtags based on confidence values.

12. The system of claim 11, wherein the determining the set of hashtags further comprises:
 selecting a subset of the set of hashtags based on a predetermined threshold.

13. The system of claim 12, further comprising:
 providing the subset of the set of hashtags to a client computing device.

14. The sysetm of claim 9, wherein the training data associated with the content items includes contextual information, wherein the contextual information includes at least one of time of day, day of week, week of year, or location associated with creation of the content item.

15. A non-transitory computer-readable storage medium including instructions that, when executed by at least one processor of a computing system, cause the computing system to perform a method comprising:
 acquiring training data associated with content items, wherein the content items are associated with hashtags already created by users;
 training a machine learning model based on the training data and the hashtags associated with the content items;
 upon new content items associated with new hashtags becoming available, refining the machine learning model based on new data and the new hashtags associated with the new content items; and
 in response to detection of keystrokes typed by a user who intends to create a hashtag for a content item,
  determining a set of hashtags associated with the content item based on the machine learning model, and
  presenting one or more hashtags of the set of hashtags for selection by the user through an user interface, wherein the one or more hashtags are consistent with the intent as indicated by the keystrokes of the user.

16. The non-transitory computer-readable storage medium of claim 15, wherein the training data associated with the content items further includes at least one of text information, user information, an image, or video associated with the content item.

17. The non-transitory computer-readable storage medium of claim 15, wherein the determining the set of hashtags further comprises:
 determining a confidence value for each hashtag in the set of hashtags; and
 sorting the set of hashtags based on confidence values.

18. The non-transitory computer-readable storage medium of claim 17, wherein the determining the set of hashtags further comprises:
 selecting a subset of the set of hashtags based on a predetermined threshold.

19. The non-transitory computer-readable storage medium of claim 18, further comprising:
 providing the subset of the set of hashtags to a client computing device.

20. The non-transitory computer-readable storage medium of claim 14, wherein the training data associated with the content items includes contextual information, wherein the contextual information includes at least one of time of day, day of week, week of year, or location associated with creation of the content item.

* * * * *